US000001538H

United States Statutory Invention Registration [19]

[11] Reg. Number: H1538

Harryman

[45] Published: Jun. 4, 1996

[54] USE OF COAL FEEDSTOCK TO A COAL GASIFICATION PLANT FOR REMOVING SULFUR FROM A GASEOUS STREAM

[75] Inventor: John M. Harryman, Katy, Tex.

[73] Assignee: Shell Oil Company, Houston, Tex.

[21] Appl. No.: 234,910

[22] Filed: Apr. 26, 1994

[51] Int. Cl.[6] ..... C10K 1/20

[52] U.S. Cl. ..... 252/373; 423/244.01; 423/574.1

[58] Field of Search ..... 423/242.2, 242.1, 423/244.03, 244.01, 569, 575; 252/373

[56] References Cited

U.S. PATENT DOCUMENTS

| | | | |
|---|---|---|---|
| 2,992,065 | 7/1961 | Feustel et al. | 423/242.1 |
| 4,071,606 | 1/1978 | Ratcliffe et al. | 423/569 |
| 4,452,772 | 6/1984 | Knoblauch et al. | 423/569 |
| 4,702,899 | 10/1987 | Barczak et al. | 423/244 |

FOREIGN PATENT DOCUMENTS

| | | | |
|---|---|---|---|
| 1153317 | 9/1983 | Canada | 423/244.03 |
| 0271994 | 6/1988 | European Pat. Off. | 423/242.2 |
| 56-59604 | 5/1981 | Japan | 423/244.01 |

OTHER PUBLICATIONS

"General Engineering Handbook" edited by O'Rourke (1932) McGraw–Hill Book Company, New York, 1st edition pp. 620–621.

*Primary Examiner*—Charles T. Jordan
*Assistant Examiner*—John R. Hardee

[57] ABSTRACT

A process of utilizing a portion of a coal feedstock to a coal gasification plant for the removal of sulfur compounds from a gaseous stream comprising sulfur dioxide and hydrogen sulfide, particularly a tail gas stream from a sulfur recovery plant, by contacting the gaseous stream with the coal feedstock. The laden coal is subsequently fed to a coal gasification plant and gasified to make synthesis gas.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

USE OF COAL FEEDSTOCK TO A COAL GASIFICATION PLANT FOR REMOVING SULFUR FROM A GASEOUS STREAM

FIELD OF THE INVENTION

This invention relates to a process of utilizing coal feedstock to a coal gasification plant for reducing the emission of sulfur compounds to the atmosphere in a coal gasification plant.

BACKGROUND OF THE INVENTION

As the result of increasingly stringent limitations on sulfur emissions to the atmosphere, a considerable amount of effort has been devoted recently to reducing the sulfur content of waste gases.

A developing area of sulfur recovery technology is that of tail gas clean up, that is, of removing trace quantities of sulfur compounds from gaseous effluent streams of sulfur recovery plants, such as Claus or SUPERCLAUS™ tail gas streams. These streams commonly exist in coal gasification plants, refineries, chemical plants, natural gas processing plants, etc.

In a typical Claus process, elemental sulfur is manufactured from hydrogen sulfide by partial oxidation of the hydrogen sulfide to sulfur dioxide. This is followed by reaction of the sulfur dioxide formed with the remaining part of the hydrogen sulfide in the presence of a catalyst to form elemental sulfur and water. A portion of the reaction occurs in a thermal combustor-reactor, the remainder occurs in catalytic converters. In a typical SUPERCLAUS™ process, hydrogen sulfide is selectively oxidized to produce elemental sulfur. These gaseous effluent streams may contain substantial quantities of sulfur compounds. For example, gaseous effluent streams from a two-stage Claus or modified Claus plant typically can contain 3 to 10% of the sulfur present in the gas fed to the Claus plant and in the form of elemental sulfur, hydrogen sulfide, sulfur dioxide, carbonyl sulfide, carbon disulfide, and the like. Tail gas streams from Claus plants and SUPERCLAUS plants typically contain less than 0.4% by volume of oxygen.

Tail gas cleanup processes have been developed to remove a large part of the residual sulfur compounds from the Claus and SUPERCLAUS tail gas streams to meet current 10 environmental emissions standards. Among the known tail gas cleanup processes are Shell Claus Off-Gas Treating (SCOT) Process and the Beavon Sulfur Off-Gas Process (BSRP). Both of these processes require that the amount of water vapor present in the gaseous effluent stream be reduced before further treatment, which results in significant equipment and maintenance costs.

Further, the use of the chemical absorption and oxidation/reduction processes, in the Shell Claus Off-Gas Treating (SCOT) or the Beavon Sulfur Off-Gas Processes (BSRP), to achieve high overall sulfur removal level, can entail high investment and energy costs as well as expensive chemicals. Portions of the chemicals used may be degraded and result in nonregenerable streams. For example, in the Shell Claus Off-Gas Treating Process, Claus tailgas is heated along with $H_2$ or a mixture of $H_2$ and CO. The combined gas stream is then reduced with a cobalt-molybdate catalyst supported on alumina to convert the sulfur compounds to $H_2S$. An absorber is used to preferentially extract $H_2S$ from the gas stream using an alkanolamine solvent. The stripped and concentrated $H_2S$ is recycled to the Claus Sulfur recovery unit. Since a reducing gas is a necessary requisite of such a tail gas treating process, it is evident that the commercial feasibility of utilizing such a process may in some cases be determined by the availability of a suitable reducing gas at an economical price.

Consequently, alternative processes which can ameliorate or eliminate some or all of these disadvantages are highly desirable.

To date, such processes have not been made available. U.S. Pat. No. 4,533,529, issued Aug. 6, 1985, discloses the use of zinc oxide for the removal of residual sulfur from Claus plant tail gas. The laden zinc oxide is regenerated with an oxygen-containing gas to convert the laden zinc oxide into an active zinc oxide, producing a sulfur containing effluent stream which is returned to the Claus sulfur recovery plant. This process entails the high costs of regenerating the laden zinc oxide absorbent, that of recovery of the sulfur contained in the regeneration effluent stream, as well as the high cost of zinc oxide.

It has been known for some years that coal is capable of recovering sulfur compounds. However, most of these prior art processes entail high costs of energy, chemicals or capital investment, and coal is often either consumed during the process or is regenerated at an extra cost. Further, similar processes have not been applied to the treatment of Claus plant tail gas streams which contain sulfur oxides as well as hydrogen sulfide as hereinafter described to achieve a Claus tail gas cleanup process capable of 99.5% and higher overall sulfur recovery, while eliminating the need for coal consumption or regeneration.

U.S. Pat. No. 5,039,507, issued Aug. 13, 1991, discloses a process for reducing sulfur dioxide in flue gases with charcoal, coke, active coal, or mineral coal at a temperature as high as 950°–1050° C. to produce sulfur and ashes. This process has the disadvantage of entailing high energy costs of heating sulfur dioxide-containing gases to about 1000° C., as well as of cooling the effluent sulfur-containing stream to recover sulfur. Further, coal or charcoal, etc. is converted to ash, and consumed during the sulfur recovery process. The process is therefore not cost effective.

U.S. Pat. No. 4,207,292 issued Jun. 10, 1980, discloses a process for reducing sulfur dioxide with coal which is electrically heated to at least 1150° F. (700° C.) in the presence of steam whereby the coal is oxidized. The process also has the disadvantage of high energy costs, as well as costs for coal consumed.

U.S. Pat. No. 4,147,762, issued Apr. 3, 1979, discloses a process for reducing $SO_2$ by contact with coal in the presence of steam at a temperature of 1150°–1550° F., wherein coal is oxidized and consumed to form ashes. The reduced effluent stream is cooled to recover sulfur. Again, this process has the disadvantage of entailing high costs from coal consumption and high energy costs of heating sulfur dioxide-containing gases, as well as of cooling the effluent sulfur-containing stream to recover sulfur.

U.S. Pat. No. 4,071,606, issued Jan. 31, 1978, discloses a process for producing sulfur from sulfur dioxide using agglomerating coals sized below 500 microns at a temperature of 600°–1000° C. The process entails high energy costs and is limited to pulverized agglomerating coals which are consumed during the process.

U.S. Pat. No. 3,563,704, issued Feb. 16, 1971, teaches a process for removing sulfur compounds using a carbonaceous material, preferably activated charcoal, wherein the spent carbonaceous material is regenerated by reducing with $H_2$ and/or carbon monoxide. Thus, the process is not cost effective because of the expensive regeneration step involved.

U.S. Pat. No. 1,771,480, issued Mar. 2, 1926, and U.S. Pat. No. 1,751,066, issued Mar. 18, 1930, teach a process for first reducing sulfur containing gases with a carbonaceous material and hydrocarbons at 700°–800° C., and reducing further with coke produced by sudden coking of bituminous coal. The process is again tedious, not cost effective. Coal is also consumed during the process.

WO93/13184, published Jul. 8, 1993, discloses a process for treating gases obtained by coal gasification, residue gasification, refuse gasification or oil gasification, which comprises hydrogenating the gas obtained to convert sulfur compounds to hydrogen sulfide. The hydrogen sulfide is then removed from the gas stream by adsorption or absorption on a solid or liquid sorbent, such as iron oxide, calcium oxide and/or manganese oxide, active carbon, coal, etc. In this process, sulfur compounds are converted to hydrogen sulfide in a hydrogenation reactor containing a hydrogenation catalyst, such as a Co-Mo catalyst supported on alumina before being absorbed by the absorbent. Since a catalyzed hydrogenation reaction is required, this process is therefore not cost effective.

Thus, there remains a need for an economic and effective process for removing sulfur compounds in waste gases, particularly in a Claus tail gas stream, which does not require high energy costs and/or coal consumption/regeneration. The process should also be capable of meeting stringent air quality control requirements.

SUMMARY OF THE INVENTION

This invention relates to a process of utilizing a portion of a coal feedstock to a coal gasification plant for the removal of sulfur compounds from a gaseous stream comprising sulfur oxides and hydrogen sulfide, particularly a tail gas stream from a sulfur recovery plant, by contacting the gaseous stream with the coal feedstock. The laden coal is subsequently fed to a coal gasification plant and gasified to make synthesis gas.

BRIEF DESCRIPTION OF THE DRAWINGS

The above description, as well as further objects, features and advantages of the present invention, will be more fully appreciated by reference to the following detailed descriptions and illustrative embodiment in accordance with the present invention, when taken in connection with the accompanying drawings, wherein.

Throughout FIGS. 1 and 2, the same reference numerals are used for similar purposes, and accessories such as valves, pumps and control instruments not necessary for the purpose of understanding the present invention are not (all) shown.

DESCRIPTION OF THE EMBODIMENTS

Figure 1:
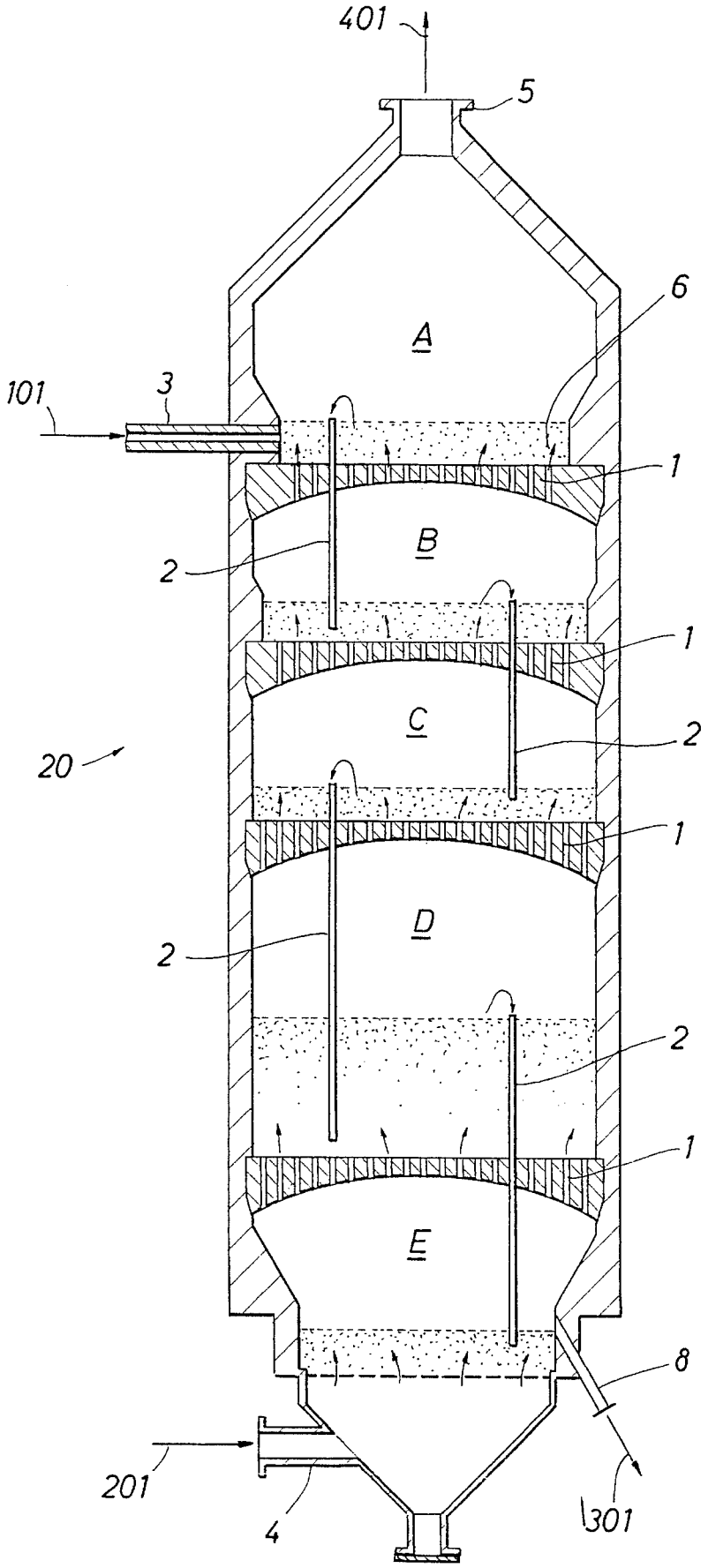
FIG. 1 demonstrates a contactor suitable for carrying out the present process for the desulfurization of a gaseous stream, particularly a Claus tail gas, utilizing a pulverized feedstock coal to a coal gasifier.

This present invention relates to an economically favorable process which reduces the capital and operating costs in a process for desulfurizing a sulfur compound-containing gaseous stream. The process also has a very high sulfur recovery efficiency, and is capable of meeting stringent air quality control requirements. The process involves the utilization of a coal feedstock to a coal gasification process for desulfurizing a sulfur-containing gaseous stream. The invention also involves a process for desulfurizing with coal a tail gas stream from a sulfur recovery unit, particularly a Claus sulfur plant, or a SUPERCLAUS™ sulfur plant. The invention further includes the use of all or a portion of the coal feedstock to a coal gasifier for desulfurizing a tail gas stream from a Claus sulfur plant or a SUPERCLAUS™ sulfur plant.

In general, all of the usual types of coal used commercially may be employed in the practice of the present invention, including peat, lignite, anthracite, subbituminous, bituminous, super-bituminous coal, brown coal or petroleum coke. Most coals including bituminous coal or any of the variant forms thereof are characterized by having a volatile (ordinary hydrocarbonaceous) component, a non-volatile component of fixed carbon content, and minor amounts of conventional impurities (such as ash). In general, the fixed or non-volatile carbon content of the coal to be used varies widely in accordance with the nature or type of coal employed, ranging, e.g. from an amount as high as 90% or more in coke, 80% or more in anthracite, etc., to an amount as low as 25 to 35% or more in conventional bituminous coal. Typically, these coals have a mean pore radius of more than 20 angstroms, more specifically more than 100 angstroms, and a surface area of less than 1000 square meters per gram, specifically of less than 150 square meters per gram, and more specifically of about 50–100 square meters per gram. Optionally, the coal utilized for the present desulfurization process can be a mixture of the above-described usual type of coal(s) with certain amounts of active carbon, dolomite, lime, iron compounds and/or siderite. The particular physical nature of the coal is not of special importance; nevertheless, it should be of such form as will facilitate uniform mixing and distribution and should provide for efficient absorption and/or adsorption of sulfur compounds from the gaseous stream. Typically the suitable coal will contain about 0 to 10% by weight of sulfur.

The coal can be ground to fine particles before being utilized for gasification and/or desulfurization. The coal milling and drying unit includes a conventional roller mill with an internal dynamic classifier. These are similar to those used in a pulverized coal boiler. The mill grinds the coal to a size range suitable for efficient gasification, such as less than 500 microns, 99% below 250 microns, etc. Preferably, the coal is dried to contain a low moisture content, e.g. to 1 to 3% by weight in moisture content. Optionally, a heated inert gas stream can be used to carry the fine coal to collection in a baghouse.

According to the present invention, a sulfur compound containing-gaseous stream is introduced to a suitable gas-solid contact zone which provides sufficient contact between the gaseous stream and the coal, and which is designed to be effective in causing the sulfur compounds in the gaseous stream to be removed by the solids. The contact of the gaseous stream with the coal can be a batch process or a continuous process, and can occur in co-current, counter-current, cross-current flow or a combination of these flow patterns. Counter-current flow has been found to be particularly efficient in removing sulfur of low concentration, because the final contact of the sulfur compound-containing gaseous stream is with fresh coal which has not been loaded with sulfur removed from the gaseous stream.

As a preferred embodiment, the coal used in the desulfurization process is continuously or discontinuously replaced by adding coal into the top portion of the contactor (contact zone). The laden coal is removed either continuously or discontinuously from the base of the contactor. Preferably, the coal is preheated to a temperature above the moisture dew point of the sulfur-containing gaseous stream to be treated to avoid condensation of moisture contained in the gaseous stream. As a non-limiting example, where a Claus sulfur plant tail gas is treated, the gas may be heated to about 160° F. (68° C.) when air is the oxygen source in the Claus sulfur plant.

In the contactor, sulfur and sulfur compounds are transferred from the gas stream to the coal by several mechanisms. Non-limiting examples of such mechanisms are: a) absorption of sulfur compounds, such as hydrogen sulfide, sulfur vapor, liquid sulfur, etc., present in the gaseous stream to be treated; b) formation of additional sulfur by the reaction of hydrogen sulfide and sulfur dioxide on the surface of the coal to form sulfur and subsequently absorbed/adsorbed by the coal; and c) reduction of sulfur oxides by coal to sulfur and subsequent absorption of sulfur by coal. Where a counter current vertical contactor is used, the gaseous stream is introduced into the bottom and is cooled as it flows up through the downward-moving coal, which provides greater driving force for absorption of sulfur compounds, as well as the condensation and solidificaton of sulfur onto the coal.

The laden coal exiting the contactor can optionally be utilized as a feedstock, or a portion of the feedstock to a coal gasification plant. In one specific embodiment of the present invention, the laden coal is generated from a contactor located in a non-coal gasification plant, e.g. a chemical plant, a refinery, etc. In another specific embodiment of the present invention, the laden coal is generated from a contactor located in a coal gasification plant. Preferably, the laden coal is utilized as the feedstock coal to the same coal gasification plant at which the contactor is located. More preferably, the laden coal is generated from a Claus sulfur recovery plant located in a coal gasification plant and is being utilized as a portion of the feedstock coal to the same coal gasification plant. The laden coal may constitute 0.1 to 100% of the feedstock coal to the coal gasification plant.

The gaseous streams to be treated by the process of the present invention in its broadest aspect are selected from any gaseous stream which contains either a trace or a substantial amount of sulfur compounds, particularly those comprising sulfur dioxide, more particular those comprising more than 0.1% by volume of sulfur dioxide. Non-limiting examples of the gaseous streams which can be treated by the present process include industrial flue gases, digester gases, and tail gases from sulfur recovery units. These gaseous streams typically contain sulfur dioxide and may also contain hydrogen sulfide, sulfur, COS, $CS_2$, and other inorganic or organic sulfur compounds. The gaseous stream may contain a substantial concentration of oxygen, such as in boiler flue gases. The gaseous stream may contain a very minimum concentration of oxygen, such as in a tail gas generated from a Claus sulfur recovery plant which may contain less than about 0.1% by volume of oxygen or may even be substantially free of oxygen, and in a tail gas generated from a SUPERCLAUS™ sulfur recovery plant which may contain less than about 0.4% by volume of oxygen. A specific embodiment of the present invention, the gaseous stream to be treated is from a SUPERCLAUS™ sulfur recovery plant. As a preferred embodiment, the gaseous stream to be treated is a tail gas from a Claus sulfur recovery plant which typically contains less than 0.1% of oxygen, about 0.1 to 1.5% by volume of hydrogen sulfide, about 0.05 to 0.8% of sulfur dioxide, about 0.01 to 0.6% of COS, and about 0.02 to 0.3% of elemental sulfur. Optionally, oxygen from an external source is introduced to the contactor.

The suitable temperature for the desulfurization process in the contactor is one of which no significant quantity of the coal is oxidized. Thus, the maximum temperature in the contactor is dependent upon many factors such as the concentration of oxygen, the pressure in the contactor, the type of coal utilized, and the moisture content of the coal. For example, when the gaseous stream in the contactor contains about 20% of oxygen under atmospheric pressure, the maximum suitable temperature in the contactor may range from about 300° F. to about 650° F. where a bituminous coal with 1 to 2% by weight of moisture content is used, from about 275° F. to about 600° F. where a lignite or sub-bituminous coal with 5 to 7% by weight of moisture content is utilized, and from about 725° F. to about 950° F. where a petroleum coke with 0.5 to 1% of moisture content is utilized. When the gaseous stream in the contactor contains less than 8% of oxygen, which is the flammability limit for high volatile coals, the maximum suitable temperature can be as high as 600° C. (1112° F.). When the gaseous stream in the contactor contains less than 1% of oxygen, the maximum suitable temperature can be over about 1000° C. (1832° F.). As a non-limiting example, the operating temperature in the contactor is from about 25° C. to about 600° C. when the oxygen content is less thant 8%, and the temperature can be from about 25° C. to about 600° C. when the oxygen content is less than 1%.

Figure 2:
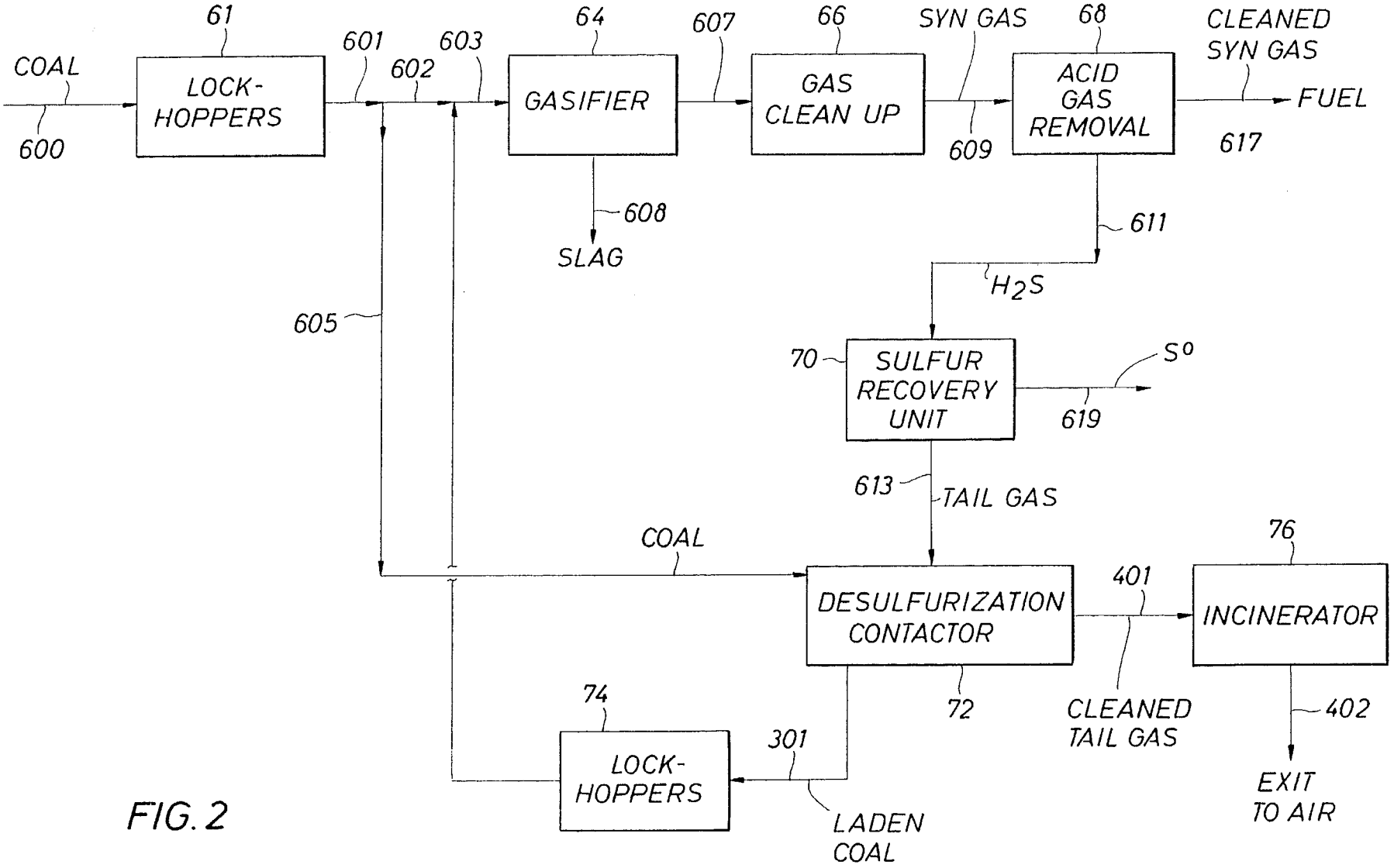
FIG. 2 is a schematic diagram showing the flow of materials in a system of the present invention for the desulfurization of a Claus tail gas in a coal gasification plant.

Referring particularly to FIG. 2 of the drawings, in a preferred embodiment of the present invention, a feedstock coal 600 to a coal gasification plant is first pressurized in lockhoppers 61. A portion of this coal 605 is fed to the desulfurization contactor 72, located in the same coal gasification plant, to remove the sulfur compounds contained in the tail gas 613 generated from the sulfur recovery plant 70. The sulfur recovery plant tail gas 613, typically at 260 to 320° F. (126° to 160° C.), may or may not be heated before entry into the coal contactor 72. The cleaned tail gas 401 exiting the contactor 72 is passed normally to an incinerator wherein residual hydrogen sulfide and other trace reduced sulfur compounds are converted to sulfur dioxide. However, when the sulfur content of the clean tail gas 401 is sufficiently low, less than 10 ppm by volume of hydrogen sulfide, then the clean tail gas 401 may be emitted directly to the air and the incinerator can be by-passed. The gaseous stream 402 exited from the incinerator 76 will contain less than about 250 ppm of sulfur dioxide and is thereafter emitted to the atmosphere.

The coal, after contact with the tail gas, exits the contactor as laden coal 301, and is passed to two or more lockhoppers 74 where it is pressurized, and subsequently combined with the remainder of the pressurized feedstock coal 602 to form a combined feedstock coal, and is conveyed, optionally with nitrogen, to the gasifier's 64 coal burners.

The partial combustion of coal to produce synthesis gas, which is substantially carbon monoxide and hydrogen, and particulate slag and flyslag, is well known. Several such processes for the preparation of hydrogen, carbon monoxide, and slag are currently being developed. Accordingly, details of the gasification process are related only insofar as is necessary for understanding of the present invention.

In general, the gasification is carried out by partially combusting the coal with a limited volume of oxygen at a temperature normally between about 800° C. and 2000° C. The reaction product stream 607, which comprises hydrogen, carbon monoxide, carbon dioxide, and water, is removed from top of the gasifier 64 as the reaction product stream 607. Inorganic incombustible material is separated in the reactor into particles called "slag" (denser) and "flyash" (lighter). The flyash particles are removed overhead, while the denser materials flow along the reactor wall as a molted slag, collected in the hearth of the reactor, from which it is discharged downward through an outlet or orifice in the hearth, referred to as a slag tap, into a water bath. As the molten slag contacts the water bath, the slag solidifies into dense, glassy granules. These slag granules fall into a collecting vessel located beneath the slag bath and are collected and dried. Slag can be sold and/or utilized as a raw material for manufacture of cement and as filler material in asphalt.

About 10% of the sulfur contained in the coal feedstock 603 will be part of the slag 608 leaving the gasifier. The remaining 90%, mostly as $H_2S$, with COS, etc., leaves the gasifier with the product synthesis gaseous stream 609. The product gaseous stream 609 is subsequently conditioned by removal of solids, cooling, and washing. The conditioned stream then flows to an Acid Gas Removal (AGR) unit 68, where most of the sulfur compounds such as $H_2S$ and COS, are absorbed into a solvent, such as an alkanolamine. A non-limiting example of an Acid Gas Removal unit includes the Sulfinol process. Then the cleaned synthesis gas stream 617 is for use and/or sale as fuel. The acid gases $H_2S$, COS, etc., 611 are subsequently distilled out of the solvent and fed to a sulfur recovery unit, such as a Claus sulfur recovery unit (SRU) or a SUPERCLAUS™ sulfur recovery unit. In a Claus sulfur recovery unit elemental sulfur is manufactured from hydrogen sulfide by partial oxidation of the hydrogen sulfide to sulfur dioxide. This is followed by reaction of the sulfur dioxide formed with the remaining part of the hydrogen sulfide in the presence of a catalyst to form elemental sulfur and water. The elemental sulfur 619 is recovered as a product.

The gaseous effluent stream (tail gas) 613 may contain substantial quantities of sulfur compounds. For example, gaseous effluent streams from a two-stage Claus or modified Claus plant typically can contain about 3 to 10% of the sulfur present in the gas fed to the Claus plant in the form of elemental sulfur (e.g. 0.01 to 0.2% by volume), hydrogen sulfide (e.g. 0.1 to 1.5% by volume), sulfur dioxide (e.g. 0.05 to 0.8% by volume), carbonyl sulfide (e.g. 0.01–0.6% by volume), carbon disulfide, and the like. Tail gas streams from Claus plants typically contain less than 0.1% by volume of oxygen and that for SUPER CLAUS less than 0.4%.

The tail gas stream 613 is passed typically to a contactor 72 to be desulfurized by a portion of the feedstock coal 605 as described above. Optionally, oxygen can be added to the contactor 72. The desulfurization process in contactor 72 will effectively remove over 96% of the sulfur compounds in the tail gas stream 613. The cleaned effluent stream 401 is passed to an incinerator 76 wherein residual hydrogen sulfide and other reduced sulfur compounds are converted to sulfur/dioxide However, when the sulfur content of the treated gas stream is sufficiently low, less than 10 ppm by volume of hydrogen sulfide, then the cleaned effluent stream 401 can be emitted directly to the air. The gaseous stream 402 exiting the incinerator 76 will contain less than 250 ppm of sulfur dioxide and is thereafter emitted to the atmosphere.

It has been found the present process effectively facilitates the removal of the sulfur compounds present in the gaseous stream. It also eliminates the requirement for a high cost sulfur treating unit, such as a SCOT plant, where a sulfur plant tail gas is treated. Further, the process is suitable for cleaning up a sulfur dioxide containing stream, and does not require expending the costs for the hydrogenation of sulfur dioxide into hydrogen sulfide, as required by prior art process, prior to the removal by the feedstock coal. Moreover, the absorbent coal can be utilized for generating synthesis gas, thus further saving the costs otherwise needed for regeneration or disposal of absorbents.

The invention will be illustrated by the following prophetic example which is provided for illustration purposes only and is not intended to limit the scope of the present invention.

ILLUSTRATIVE EMBODIMENT

Part A: Feedstock Coal

A Kentucky coal containing about 2.9% by weight of sulfur is utilized both as the feedstock to the coal gasification plant, and as the material for the desulfurization of Claus tail gas in the coal gasification plant. The coal is simultaneously ground to a size of which 99% is below 250 microns and dried to a moisture content of 1 to 3% by weight. To ensure inert conditions in the dryer, excessive air in the dryer is carefully controlled by the addition of nitrogen. About 5% of the milled and dried coal is sent to a contactor for the desulfurization of the Claus tail gas. The coal loaded with sulfur is subsequently returned to be mixed with the remaining dried coal, and then delivered to the gasifier feed system using a pneumatic conveying system. The feedstock coal is fed to the gasifier at 290,000 pounds per hour (PPH).

Part B: Desulfurization of Claus Tail Gas

Referring more particularly to FIG. 1 of the drawings, the contactor 20 for carrying out the desulfurization of a Claus tail gas in the present embodiment comprises a cylindrical vessel constructed of stainless steel with external heat loss insulation. The contactor is about 7 feet in diameter and 40 feet in length, having a coal inlet 3, located at the upper portion of the contactor adapted to receive coal from an external source. The contactor also has a gas inlet 4 adapted to receive the Claus tail gas produced from a Claus gas plant in a coal gasification plant. The contactor has five compartments. Each contains a grid 1 through which the gaseous stream comprising the tail gas to be treated flows at a sufficient velocity to accomplish two purposes: first to prevent the coal to drop through the grid, and second, to fluidize the pulverized coal in the compartments. Each compartment has an overflow pipe 2 through which the pulverized coal overflows from an upper compartment into the compartment immediately below.

In operation, pulverized coal 101 described in Part A above is preheated with a heater (not shown) externally of the contactor 20 to about 160° F. (71° C.), a temperature higher than the moisture dew point of the tail gas when using air as the oxidant source in the Claus unit. The preheated coal is continuously passed into the contactor via Inlet 3 at about 14,000 pounds per hour (PPH), whereby the coal passes continuously downwardly through compartments A, B, C, D, and E in the contactor.

The Claus tail gas to be treated 201, produced from a the Claus sulfur plant in the coal gasification plant, has a temperature of about 260 to 320° F. (126° C. to 160° C.), a pressure of less than 4 psig, and sulfur compounds of about 233 PPH, measured by the weight of sulfur. The approximate concentrations of the various sulfur compounds (in mole percent) in the Claus tail gas 201 are:

| | |
|---|---|
| hydrogen sulfide | 0.3% |
| sulfur dioxide | 0.15% |
| carbonyl sulfide (COS) | 0.1% |
| sulfur (S°) | 0.1% |

The above Claus tail gas 201 is charged into the contactor at 32,000 PPH via gas inlet 4 located in the lower portion of the contactor. The gas 201 is charged in an upward direction so that it rises upwardly in the vessel in a counterflow relation to the pulverized coal. It proceeds from compartment E to D, C, B, and A, and thereafter leaves as cleaned tail gas stream 401 through Exit 5.

The pulverized coal flows downwardly through overflow pipes, thereby passing compartments A, B, C, D, and drops to compartment E from which it is withdrawn as laden coal 301 from exit 8. The laden coal 301 contains 1.6% by weight of absorbed sulfur, in addition to the 2.9% by weight of sulfur in fresh coal. During the process, the upwardly flowing tail gas continuously contacts the downwardly flowing coal on the high surface area of the coal through five compartments, therefore sulfur compounds are transferred from the tail gas stream to the coal.

The cleaned tail gaseous stream 401 exiting from Exit 5 contains less than 250 ppm by volume of sulfur compounds, which amounts to more than 96.6% removal of the sulfur compounds originally contained in the tail gas. The cleaned tail gaseous stream 401 exiting the contactor is passed normally to an incinerator wherein residual hydrogen sulfide and other trace reduced sulfur compounds are converted to sulfur dioxide and are emitted to the atmosphere. Alternatively, when the concentration of reduced sulfur in the cleaned tail gas 401 is sufficinetly low, less than 10 ppm by volume of hydrogen sulfide, the cleaned tail gaseous stream 401 may be emitted directly to the atmosphere.

Part C: Gasification of Laden Coal

Referring to FIG. 2 of the drawings, the laden coal 301 exiting the contactor in Part B is fed to lockhoppers in blocked-out operation. A full lockhopper is pressurized to 500 psig and the laden coal is delivered to the coal gasifier feed system using a pneumatic conveying system. The laden coal is combined with the unladen dried feedstock coal in a 1:20 ratio. Total coal feed to the gasifier is 290,000 PPH.

The combined feedstock coal containing about 8600 PPH sulfur is gasified using an entrained flow gasifier at 1400° to 1800° C. under pressure to form $H_2$, CO, $H_2S$, COS, $H_2O$, $CO_2$, some trace $CH_4$, etc. About 10% of the sulfur contained in the feedstock coal will leave with ungasifiable mineral matter as slag or flyslag. The rest of the sulfur leaves the gasifier with the synthesis gas mostly as $H_2$with some COS etc. The synthesis gas, containing sulfur compounds, is subsequently extracted with an alkanolamine containing solvent, whereby most of the sulfur compounds are absorbed into the solvent. The sulfur compounds are thereafter distilled out and fed to a Claus sulfur recovery unit in which sulfur is recovered as sulfur at about 7370 PPH. A tail gas is produced at a rate of 32,000 PPH containing 230 PPH of sulfur from the Claus sulfur plant and is thereafter sent to the contactor for the desulfurization with coal.

The ranges and limitations provided in the present specification and claims are those which are believed to particularly point out and distinctly claim the present invention. It is, however, understood that other ranges and limitations that perform substantially the same function in substantially the same manner to obtain the same or substantially the same result are intended to be within the scope of the present invention as defined by the present specification and claims.

I claim:

1. A process for the desulfurization of a sulfur compound-containing gaseous stream, which process comprises the steps of:

(a) introducing said sulfur compound-containing gaseous stream into a contact zone comprising solid particles of coal, and (b) contacting the sulfur compound-containing gaseous stream in said contact zone with said coal causing the removal of said sulfur compounds from said sulfur compound-containing gaseous stream in the presence of said coal and thereby producing a laden coal and a contact zone effluent stream lean in sulfur compounds;

wherein said sulfur compound-containing gaseous stream introduced to the contact zone in (a) comprises more than 0.05% by volume of sulfur dioxide;

wherein in step (b), the contact zone is maintained at a temperature at which no substantial amount of coal within said contact zone is oxidized.

wherein the laden coal from step (b) is passed to a coal gasifier and is gasified to produce synthesis gas.

2. A process as described in claim 1, wherein said sulfur compound-containing stream in step (a) further comprises hydrogen sulfide.

3. The process as described in claim 1, wherein in step (b), the oxygen concentration within the contact zone is about 0–8% by volume.

4. The process as described in claim 3, wherein in step (b), the temperature within the contact zone is maintained at from about 25° C. to about 600° C.

5. The process as described in claim 1, wherein in step (b), the oxygen concentration in the contact zone is from about 0% to about 1% by volume.

6. The process as described in claim 5, wherein in step (b), the temperature in the contact zone is maintained at from about 25° C. to about 1000° C.

7. The process as described in claim 1, wherein the coal used in step (b) has a mean pore radius of more than 20 angstroms, and a surface area of less than 1000 square meters per gram.

8. The process as described in claim 1, wherein the coal utilized for the desulfurization process is a mixture which comprises a coal and at least one ingredient selected from the

9. A process for the removal of sulfur-containing compounds from a Claus or SUPERCLAUS sulfur recovery plant effluent stream, which process comprises the steps of:

(a) introducing said Claus or SUPERCLAUSE sulfur recovery plant effluent stream into a contact zone comprising solid particles of coal;

(b) contact the Clause or SUPERCLAUSE sulfur recovery plant effluent stream in said contact zone with said coal causing the removal of said sulfur compounds from said Claus or SUPERCLAUSE sulfur recovery plant effluent stream in the presence of said coal and thereby producing a laden coal and a contact zone effluence stream lean in sulfur compounds, wherein said Clause or SUPERCLAUSE sulfur recovery plant effluent stream introduced to the contact zone in (a) comprises sulfur dioxide and hydrogen sulfide;

wherein in step (b), the contact zone is maintained at a temperature at which no substantial amount of coal within said contact zone is oxidized; wherein the laden coal from step (b) is passed to a coal gasifier and is gasified to produce synthesis gas.

10. The process as described in claim 9, wherein the oxygen concentration in the contact zone is from about 0% to 1% by volume.

11. The process as described in claim 9, wherein the coal used in step (b) is a fine powder of less than 500 microns and the coal used in step (b) has a mean pore radius of more than 100 angstroms and a surface area of less than 150 square meters per gram.

12. A process for utilizing a portion of a coal feedstock to a coal gasification plant for the removal of sulfur compounds from a sulfur compound-containing gaseous stream, which process comprises the steps of:

(a) introducing the sulfur compound-containing gaseous stream into a contact zone comprising said portion of coal feedstock, (b) contacting the sulfur compound-containing gaseous stream in said contact zone with said coal causing the removal of said sulfur compounds from said sulfur compound-containing gaseous stream in the presence of said coal and thereby producing a laden coal and a contact zone effluent stream lean in sulfur compounds, (c) passing said laden coal from (b) to a coal gasifier, and (d) gasifying said laden coal at gasifying conditions; wherein said sulfur compound-containing gaseous stream in step (a) comprises more than 0.05% by volume of sulfur dioxide;

wherein step (b), the contact zone is maintained at a temperature at which no substantial amount of coal within said contact zone is oxidized.

13. The process as described in claim 12, wherein in step (b), the oxygen concentration within the contact zone is about 0–8% by volume.

14. The process as described in claim 13, wherein in step (b), the temperature within the contact zone is maintained at from about 25° C. to about 600° C.

15. The process as described in claim 12, wherein in step (b), the oxygen concentration in the contact zone is from about 0% to about 1% by volume.

16. The process as described in claim 15, wherein in step (b), the temperature in the contact zone is maintained at from about 60° C. to about 1000° C.

17. The process as described in claim 12, wherein said sulfur compound-containing stream in step (a) further comprises hydrogen sulfide.

18. A process for the utilization of a portion of a feedstock coal to a coal gasification plant for the removal of sulfur-containing compounds from a Claus sulfur recovery plant effluent stream, which process comprises the steps of:

introducing said Claus sulfur recovery plant effluent stream into a contact zone comprising solid particles of coal;

(b) contacting the Claus sulfur recovery plant effluent stream in said contact zone with said coal causing the removal of said sulfur compounds from said Clause sulfur recovery plant effluent stream in the presence of said coal at a temperature from about 25° C. to about 500° C. and thereby producing a laden coal and a contact zone effluent stream lean in sulfur compounds, (c) passing said laden coal from (b) to a coal gasifier, and (d) gasifying said laden coal at gasifying conditions;

wherein said Claus sulfur recovery plant effluent stream introduced to the contact zone in (a) comprises sulfur dioxide and hydrogen sulfide; wherein in step (b), the contact zone is maintained at a temperature at which no substantial amount of coal within said contact zone is oxidized; wherein the oxygen concentration in the contact zone is from about 0% to about 0.1% by volume; wherein the coal used in step (b) is a fine powder of less than 500 microns and the coal used in step (b) has a means pore radius of more than 100 angstroms and a surface area of less than of about 100 square meters per gram.

19. The process as described in claim 5, wherein said Claus sulfur recovery plant and the coal gasifier in (c) are located in the same coal gasification plant.

20. The process as described in claim 19, wherein said Claus sulfur recovery plant is not located in the coal gasification plant where the coal gasifier in (c) is located.

* * * * *